United States Patent
Kim et al.

(10) Patent No.: US 8,045,497 B2
(45) Date of Patent: Oct. 25, 2011

(54) METHOD OF ALLOCATING WIRELESS RESOURCE FOR SPACE DIVISION MULTIPLE ACCESS COMMUNICATION AND WIRELESS RESOURCE ALLOCATION SYSTEM OF ENABLING THE METHOD

(75) Inventors: Ki Il Kim, Gyeonggi-do (KR); Byung Chang Kang, Gyeonggi-do (KR); Sung Jin Kim, Gyeonggi-do (KR); Jun Mo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 12/112,056

(22) Filed: Apr. 30, 2008

(65) Prior Publication Data
US 2009/0010215 A1    Jan. 8, 2009

Related U.S. Application Data

(60) Provisional application No. 60/947,490, filed on Jul. 2, 2007.

(30) Foreign Application Priority Data

Sep. 28, 2007 (KR) .................. 10-2007-0098314

(51) Int. Cl.
*H04J 3/08* (2006.01)
(52) U.S. Cl. ............... 370/315; 370/328; 455/11.1
(58) Field of Classification Search .......... None
See application file for complete search history.

(56) References Cited

U.S. PATENT DOCUMENTS

| | | | |
|---|---|---|---|
| 2005/0255808 A1* | 11/2005 | Ahmed et al. | 455/24 |
| 2006/0120477 A1 | 6/2006 | Shen et al. | |
| 2006/0203708 A1* | 9/2006 | Sampath et al. | 370/208 |
| 2006/0233265 A1* | 10/2006 | Rajan et al. | 375/259 |
| 2007/0086512 A1* | 4/2007 | Can et al. | 375/148 |
| 2007/0099571 A1 | 5/2007 | Withers, Jr. et al. | |
| 2007/0115799 A1 | 5/2007 | Ting et al. | |
| 2007/0135059 A1* | 6/2007 | Yomo et al. | 455/69 |
| 2008/0002601 A1* | 1/2008 | Coronel et al. | 370/315 |
| 2008/0165720 A1* | 7/2008 | Hu et al. | 370/315 |
| 2008/0175183 A1* | 7/2008 | Devroye et al. | 370/315 |
| 2008/0274692 A1* | 11/2008 | Larsson | 455/24 |
| 2009/0227202 A1* | 9/2009 | Doppler et al. | 455/11.1 |
| 2010/0278136 A1* | 11/2010 | Oyman et al. | 370/330 |

FOREIGN PATENT DOCUMENTS

| | | |
|---|---|---|
| KR | 2005-20576 | 3/2005 |
| KR | 2006-96360 | 9/2006 |
| KR | 2006-111238 | 10/2006 |
| KR | 2007-55313 | 5/2007 |

* cited by examiner

*Primary Examiner* — Robert Scheibel
(74) *Attorney, Agent, or Firm* — NSIP Law

(57) ABSTRACT

A system for allocating a wireless resource for a Space Division Multiple Access (SDMA) communication is provided. The system for allocating the wireless resource for the SDMA communication includes: a channel state recognition unit to recognize a channel state of wireless channels generated among adjacent nodes including a source node, a relay node, and a destination node; and a wireless resource allocation unit to control at least one of an amount of channel state information fed back from the destination node to the source node, and a relay level of a relay signal, the relay signal being generated by relaying a source signal transmitted from the source node, according to the channel state.

18 Claims, 5 Drawing Sheets

METHOD OF ALLOCATING WIRELESS RESOURCE FOR SPACE DIVISION MULTIPLE ACCESS COMMUNICATION AND WIRELESS RESOURCE ALLOCATION SYSTEM OF ENABLING THE METHOD

CROSS-REFERENCE TO RELATED APPLICATIONS

This application claims the benefit of U.S. Provisional Application No. 60/947,490, filed on Jul. 2, 2007 in the U.S. Patent and Trademark Office, and Korean Patent Application No. 2007-98314, filed on Sep. 28, 2007 in the Korean Intellectual Property Office, the disclosure of both of which are incorporated herein by reference.

BACKGROUND OF THE INVENTION

1. Field of the Invention

Aspects of the present invention relate to a Space Division Multiple Access (SDMA) technology of transmitting a signal by using a plurality of antennas, and more particularly, to a system and method of allocating a wireless resource for an SDMA communication in order to apply an additional scheme to a beam-forming scheme for an SDMA and establish an optimized SDMA communication environment.

2. Description of the Related Art

Recently, research is actively under way in order to provide various multimedia services including a voice service in a wireless communication environment, and support a high-quality and high-speed data transmission. A technology of a Multiple Input Multiple Output (MIMO) system using a channel of a space area has been rapidly developed as a part of research.

Many people desire a high-speed wireless communication service, however, many problems exist in providing or using the high-speed wireless communication service in the wireless communication environment. In particular, a limit exists in increasing a data rate in a communication environment using a wireless channel since multipath fading, selective frequency fading, various communication barriers, and the like, exist. Representative technologies for overcoming the limit are a multi-antenna technology and a signal relay technology.

The multi-antenna technology is a technology of increasing reliability of a signal transmission and acquiring a high-speed data rate by transmitting a signal using a plurality of antennas. Also, a space diversity technology of transmitting the signal via the plurality of antennas can increase reliability of a received signal. In particular, a technology of transmitting different signals to multiple users via the plurality of antennas is referred to as a Space Division Multiple Access (SDMA) technology. The SDMA technology increases a capacity of an entire system by efficiently using a wireless resource.

Beam-forming of the signals transmitted via the plurality of antennas using the SDMA technology are performed via a precoding scheme according to a wireless channel state. Specifically, interference generated between wireless channels can be reduced by appropriately precoding a data stream according to the wireless channel state. For example, a mobile terminal feeds back Channel State Information (CSI) for a wireless channel generated between the mobile terminal and a base station to the base station in which the plurality of antennas is installed, and the base station performs optimized beam-forming using the fed-back CSI. Also, the wireless resource is consumed so that the CSI may be fed back to the base station.

Also, the signal relay technology is a technology of relaying a signal generated from a source node via a relay node existing between the source node and a destination node. A power amplification relay scheme as a representative relay scheme improves a Signal-to-Interference and Noise Ratio (SINR) or a data rate since the relay node amplifies a power of a source signal and transmits the source signal to the destination node. Also, in this case, the wireless resource is consumed when the relay node relays the signal.

Also, since a beam-forming technology for an SDMA and the signal relay technology are respectively researched as separate technologies, the wireless resource cannot be efficiently used. For example, even though the relay node is not necessarily used when the channel state of the wireless channel generated between the source node and the destination node is favorable, a high data rate and a high SINR can be acquired via the appropriate beam-forming. However, in this case, consuming many wireless resources for a signal relay can be wasteful.

Also, when a desired data rate and a desired SINR can be achieved with only a slight signal amplification since the relay node and the destination node are located within a short distance, increasing a feedback amount for the CSI can waste the wireless resource despite reducing a necessity that the destination node feeds back the voluminous CSI to the source node so that the source node may perform the beam-forming.

Accordingly, a system and method of allocating a wireless resource for an SDMA communication, which can reduce waste of the wireless resource and achieve excellent performance by simultaneously using the signal relay technology and the beam-forming technology and efficiently controlling the two technologies is needed.

SUMMARY OF THE INVENTION

Aspects of the present invention provide a system and method of allocating a wireless resource for a Space Division Multiple Access (SDMA) communication which can achieve a high data rate and a high Signal-to-Interference and Noise Ratio (SINR) by mixing an SDMA technology and a signal relay technology, and transceiving data.

The present invention also provides a system and method of allocating a wireless resource for an SDMA communication which can efficiently distribute wireless resources by determining a wireless resource needed for beam-forming and a wireless resource needed for a signal relay considering a channel state of wireless channels generated among adjacent nodes.

The present invention also provides a system and method of allocating a wireless resource for an SDMA communication which can achieve a high data rate and a high SINR by appropriately distributing the wireless resource needed for beam-forming and the wireless resource needed for a signal relay.

The present invention also provides a system and method of allocating a wireless resource for an SDMA communication which can efficiently use the wireless channel by appropriately controlling an amount of channel state information fed back by a destination node.

The present invention also provides a system and method of allocating a wireless resource for an SDMA communication which can reduce a load on hardware of a mobile terminal, and conserve power by efficiently allocating the wireless channel.

According to an aspect of the present invention, there is provided a system for allocating a wireless resource for an SDMA communication, the system including: a channel state recognition unit to recognize a channel state of wireless channels generated among adjacent nodes including a source node, a relay node, and a destination node; and a wireless resource allocation unit to control at least one of an amount of channel state information fed back from the destination node to the source node, and a relay level of a relay signal, the relay signal being generated by relaying a source signal transmitted from the source node, according to the channel state.

In this instance, the wireless resource allocation unit controls at least one of the amount of the channel state information and the relay level by considering a ratio of the relay level to the amount of the channel state information according to the channel state.

In this instance, when the amount of the channel state information is fixed, the wireless resource allocation unit controls the relay level by considering the fixed amount of the channel state information, and when the relay level is fixed, the wireless resource allocation unit controls the amount of the channel state information by considering the fixed relay level.

In this instance, the system for allocating the wireless resource for the SDMA communication further includes: a control information transmission unit to transmit, to the adjacent nodes, control information related to at least one of the controlled amount of the channel state information and the controlled relay level.

In this instance, the source node performs beam-forming of a data stream using the channel state information fed back from the destination node according to the controlled amount of the channel state information, and generates the source signal.

In this instance, the relay node generates the relay signal generated by relaying the source signal according to the controlled relay level.

In this instance, the destination node feeds back the channel state information to the source node according to the controlled amount of the channel state information.

In this instance, the destination node detects the source signal generated by performing the beam-forming of the data stream, and the relay signal relayed according to the relay level.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
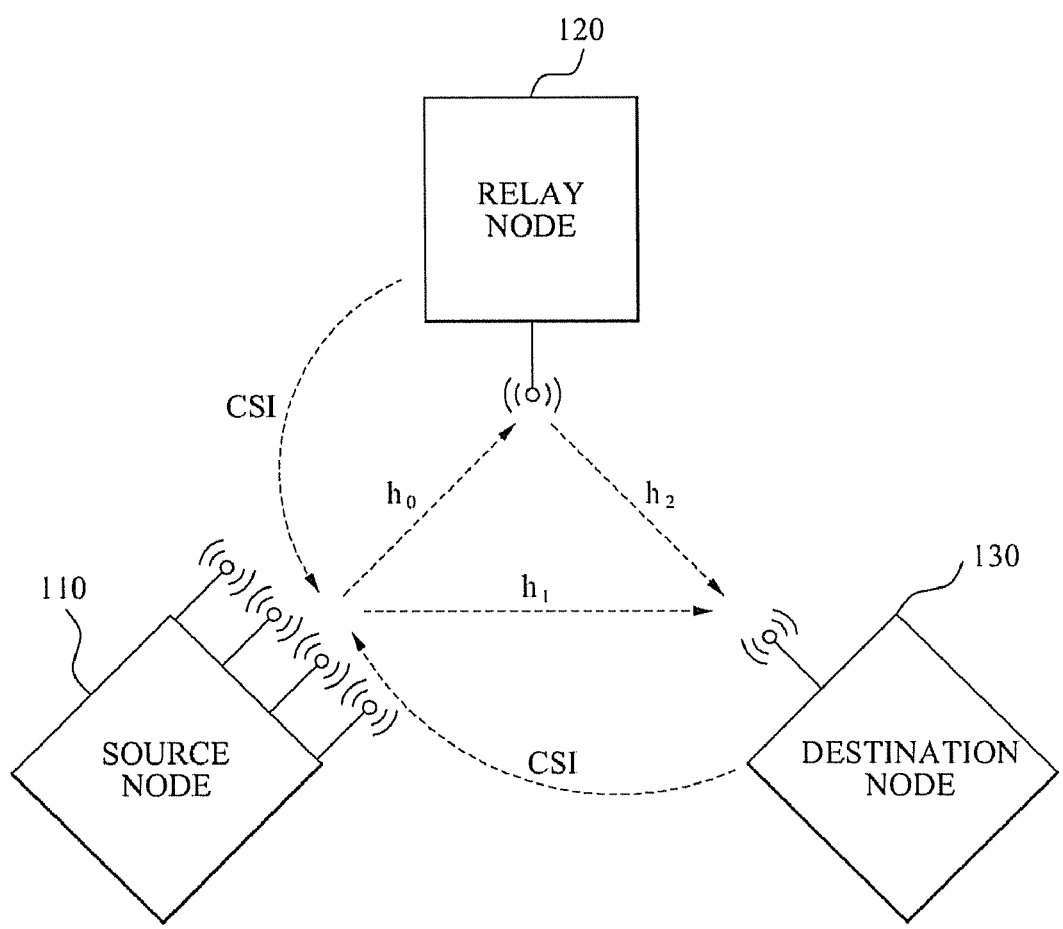
FIG. 1 illustrates a Space Division Multiple Access (SDMA) communication network according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 illustrates a Space Division Multiple Access (SDMA) communication network according to an embodiment of the present invention.

Referring to FIG. 1, the SDMA communication network according to the present embodiment of the present invention includes a source node 110, a relay node 120, and a destination node 130.

The source node 110 can be a base station, and the relay node 120 and the destination node 130 can be mobile terminals. In particular, the relay node 120 can be the mobile terminal and can be a relay device. When the relay node 120 is the mobile terminal, the relay node 120 can receive a source signal transmitted from the source node 110, and decode the source signal.

A plurality of antennas can be installed in the source node 110, and the source node 110 can transceive a signal via the plurality of antennas. Also, wireless channels are generated among adjacent nodes including the source node 110, the relay node 120, and the destination node 130.

Specifically, wireless channel $h_0$ is generated between the source node 110 and the relay node 120, wireless channel $h_1$ is generated between the source node 110 and the destination node 130, and wireless channel $h_2$ is generated between the relay node 120 and the destination node 130.

When the source node 110 intends to transmit a data stream 's' to the destination node 130, beam-forming of the data stream 's' can be performed using an SDMA scheme. In particular, the source node 110 can perform the beam-forming of the data stream 's' using the SDMA scheme. Specifically, the source node 110 can minimize interference generated between wireless channels by transmitting, to the destination node 130, a source signal generated by multiplying a beam-forming vector, which is spatially separated, by the data stream 's'.

Also, the source node 110 can recognize states of wireless channel $h_1$ generated between the source node 110 and the destination node 130, and wireless channel $h_0$ generated between the source node 110 and the relay node 120, and select the appropriate beam-forming vector using the recognized wireless channels.

The destination node 130 and the relay node 120 feed back Channel State Information (CSI) to the source node 110. Accordingly, the source node 110 can recognize the states of wireless channels $h_1$ and $h_0$. In this instance, the CSI can include at least one of Channel Direction Information (CDI) and Channel Quality Information (CQI).

For example, the source node 110 can transmit a pilot signal and the like, and the destination node 130 and the relay node 120 can estimate wireless channels $h_1$ and $h_0$ using the pilot signal and the like. In this instance, the destination node 130 and the relay node 120 can feed back information related to estimated $h_1$ and $h_0$ as CSI to the source node 110.

Also, the CSI is quantized, and is transmitted from the destination node 130 and the relay node 120 to the source node 110, and the wireless channel corresponding to the quantized CSI can be different from the actual wireless channel.

When a quantization level is high, that is, when an amount of the CSI is large, the destination node 130 and the relay node 120 can feed back accurate CSI to the source node 110, however, the high quantization level can be a cause of excessive consumption of the wireless resource by increasing the amount of the CSI.

Accordingly, as the quantization level increases, the accurate CSI is fed back to the source node 110. Therefore, the source node 110 can select the accurate beam-forming vector, thereby improving an effect of the beam-forming, however, there is a disadvantage that the amount of the fed back CSI increases. Accordingly, acquiring an appropriate effect of the beam-forming by appropriately controlling the quantization level and not excessively increasing the amount of the fed back CSI is required.

Also, the relay node 120 receives the source signal from the source node 110, generates a relay signal, and transmits the relay signal to the destination node 130. In this instance, the relay node 120 can be any one of the relay device and the mobile terminal.

When the relay node 120 transmits the relay signal to the destination node 130, various wireless resources are consumed. For example, a power of the relay signal, a frequency band of the relay signal, a relaying time of the relay signal, and the like can be consumed as consume the wireless resource. The relay node 120 determines a relay level related to the power of the relay signal, the frequency band of the relay signal, the relaying time of the relay signal, and the like, and generates the relay signal according to the determined relay level. For example, as the power of the relay signal and the relaying time of the relay signal increase, the relay level can be established high.

Also, since various wireless channels are consumed when the relay node 120 transmits the relay signal, a suitable control scheme is necessary. For example, when the state of wireless channel $h_1$ generated between the source node 110 and the destination node 130 is favorable, and the state of wireless channel $h_2$ generated between the relay node 120 and the destination node 130 is unfavorable, consuming many wireless resources for transmitting the relay signal can be undesirable. Specifically, when at least one of a high data rate and a high Signal-to-Interference and Noise Ratio (SINR) can only be acquired by the appropriate beam-forming, increasing the amount of the CSI and conserving the wireless resource for generating the relay signal can be advantageous.

Figure 2:
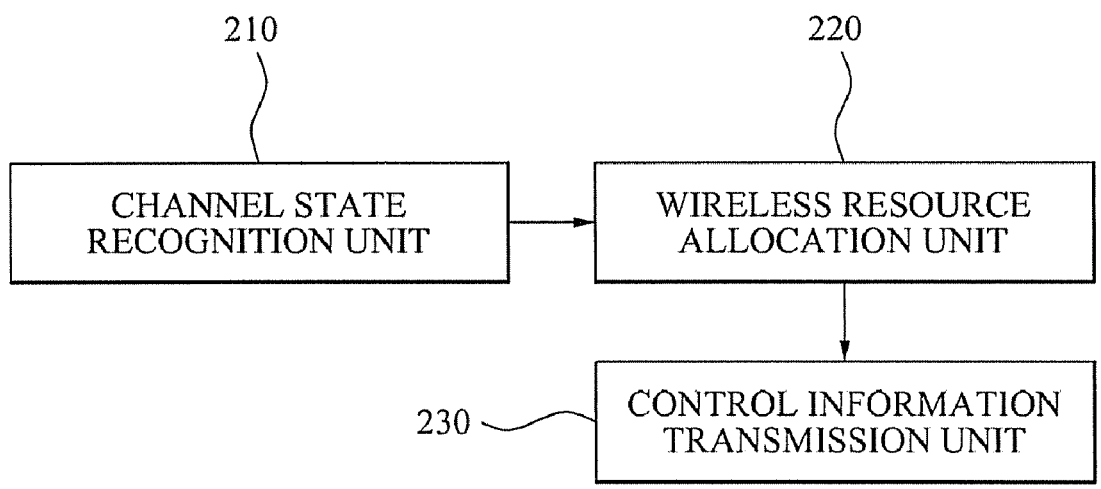
FIG. 2 is a block diagram illustrating a system for allocating a wireless resource for an SDMA communication according to an embodiment of the present invention.

FIG. 2 is a block diagram illustrating a system for allocating a wireless resource for an SDMA communication according to an embodiment of the present invention.

Referring to FIG. 2, the system for allocating the wireless resource for the SDMA communication according to the present embodiment of the present invention includes a channel state recognition unit 210, a wireless resource allocation unit 220, and a control information transmission unit 230.

In this instance, the system for allocating the wireless resource for the SDMA communication of the present invention can be installed in a source node, a relay node, a destination node, and a separate node.

The channel state recognition unit 210 recognizes a channel state of wireless channels generated among adjacent nodes including a source node, a relay node, and a destination node.

In this instance, the channel state recognition unit 210 can recognize the channel state of the wireless channels generated among the adjacent nodes via various methods. In this instance, the channel state recognition unit 210 can recognize the channel state of the wireless channels generated among the adjacent nodes using various channel estimation schemes. Also, the channel state recognition unit 210 can estimate the channel state of the wireless channels, receive information related to the channel state estimated by the at least one of the adjacent nodes, and recognize the channel state of the wireless channels.

For example, a case where the system for allocating the wireless resource for the SDMA communication of the present invention is installed in the relay node is assumed.

When the source node broadcasts a pilot signal, the channel state recognition unit 210 installed in the relay node can independently recognize the channel state by estimating the channel state of the wireless channel generated between the relay node and the source node.

The channel state recognition unit 210 installed in the relay node can independently estimate the channel state of the wireless channel without performing a channel estimation. Specifically, the relay node can transmit the pilot signal to the destination node, and the destination node can estimate the channel state of the wireless channel generated between the destination node and the relay node via the pilot signal. In this instance, the destination node can feed back information related to the estimated channel state to the relay node, and the channel state recognition unit 210 can independently recognize the channel state without performing the channel estimation.

Also, the wireless resource allocation unit 220 controls at least one of an amount of CSI, $\alpha$, fed back from the destination node to the source node and a relay level, $\beta$, of a relay signal the relay signal being generated by relaying a source signal transmitted from the source node, according to the channel state.

Specifically, the source node generates the source signal by performing beam-forming of a data stream using a beam-forming vector. In this instance, as the amount of the CSI, $\alpha$, fed back from the destination node to the source node increases, the more accurate a beam-forming vector can be selected, and the source signal in which the beam-forming is performed using the accurate beam-forming vector can be transmitted to the destination node at a high data rate.

Also, the relay level $\beta$ of the relay signal is related to the power of the relay signal, the frequency band of the relay signal, the relaying time of the relay signal, and the like. For example, when the relay level $\beta$ is controlled to be high, the power of the relay signal can be high, or the relaying time can be long.

Accordingly, the present invention can efficiently use the wireless resource by controlling the wireless resource consumed for the beam-forming and the wireless resource consumed for the signal relay.

In this instance, when the amount of the CSI '$\alpha$' is fixed as a predetermined value X, the wireless resource allocation unit 220 controls the relay level $\beta$ by considering X, and when the relay level $\beta$ is fixed as a predetermined value Y, the wireless resource allocation unit 220 controls the amount of the CSI '$\alpha$' by considering Y.

For example, a case where the system for allocating the wireless resource for the SDMA communication according to the present invention is installed in the source node and the relay level β is fixed as Y is assumed. In this instance, the wireless resource allocation unit 220 can control the amount of the CSI 'α' by considering the channel state of the wireless channel generated between the source node and the destination node. Specifically, when it is estimated that performance is greatly improved due to the beam-forming as the amount of the CSI 'α' increases since the channel state of the wireless channel generated between the source node and the destination node is favorable, the wireless resource allocation unit 220 can increase the amount of the CSI 'α'.

In this instance, the wireless resource allocation unit 220 can control at least one of the amount of the CSI 'α' and the relay level β by considering a ratio of the relay level β to the amount of the CSI 'α'.

Specifically, since the wireless channel available in a communication system is generally limited, the wireless resource allocation unit 220 can consider a ratio of the relay level β to the amount of the CSI 'α'.

For example, the wireless resource allocation unit 220 controls at least one of the amount of the CSI 'α' and the relay level β to reduce the relay level β as the amount of the CSI 'α' increases, and to reduce the amount of the CSI 'α' as the relay level β increases.

In this instance, the wireless resource allocation unit 220 controls at least one of the amount of the CSI 'α' and the relay level β by comparing a channel state of the first wireless channel generated between the source node and the destination node, with a channel state of the second wireless channel generated between the relay node and the destination node.

For example, a case where the channel state of the first wireless channel is favorable, and the channel state of the second wireless channel is unfavorable since the destination node is located far from the relay node is assumed. In this case, increasing the relay level β and consuming many wireless resources for generating and transmitting the relay signal can be undesirable. Accordingly, performing accurate beam-forming can be efficient by increasing the amount of the CSI 'α' for the first wireless channel instead of reducing the relay level β.

Conversely, when the channel state of the first wireless channel is unfavorable, and the channel state of the second wireless channel is favorable since the destination node is located near from the relay node, reducing the amount of the CSI 'α' for the first wireless channel and increasing the power of the relay signal can be efficient.

In this instance, the wireless resource allocation unit 220 controls at least one of the amount of the CSI 'α' and the relay level β to maximize an SINR of a received signal which is received by the destination node.

Specifically, when the amount of the CSI 'α' and the relay level β have predetermined values, the wireless resource allocation unit 220 determines whether the SINR of the received signal which is received by the destination node is maximized by considering the available wireless resource, and controls at least one of the amount of the CSI 'α' and the relay level β.

Also, the control information transmission unit 230 transmits, to the adjacent nodes, control information related to at least one of the controlled amount of the CSI 'α' and the controlled relay level β.

For example, a case where the system for allocating the wireless resource for the SDMA communication according to the present invention is installed in the source node is assumed.

In this instance, the control information transmission unit 230 can transmit, to the destination node, the control information related to the controlled amount of the CSI 'α' to feed back the CSI to the source node according to the controlled amount of the CSI 'α'. In this instance, the control information transmission unit 230 can transmit the controlled relay level β to the relay node so that the relay node may generate the relay signal according to the controlled relay level β.

Also, the destination node feeds back the CSI to the source node according to the controlled amount of the CSI. In this instance, the source node performs beam-forming of a data stream using the CSI fed back from the destination node, and generates the source signal. Also, the relay node generates the relay signal generated by relaying the source signal according to the controlled relay level.

In this instance, the destination node can recognize the beam-forming vector based on the CSI, and detect the source signal using the CSI. Also, the destination node can receive the relay signal from the relay node. Accordingly, the destination node can detect the source signal and the relay signal being in a cooperative relation.

Accordingly, the present invention can achieve a large channel amount, a high data rate, a high SINR, and the like, by detecting the source signal and the relay signal generated by appropriately distributing the wireless resource.

Figure 3:
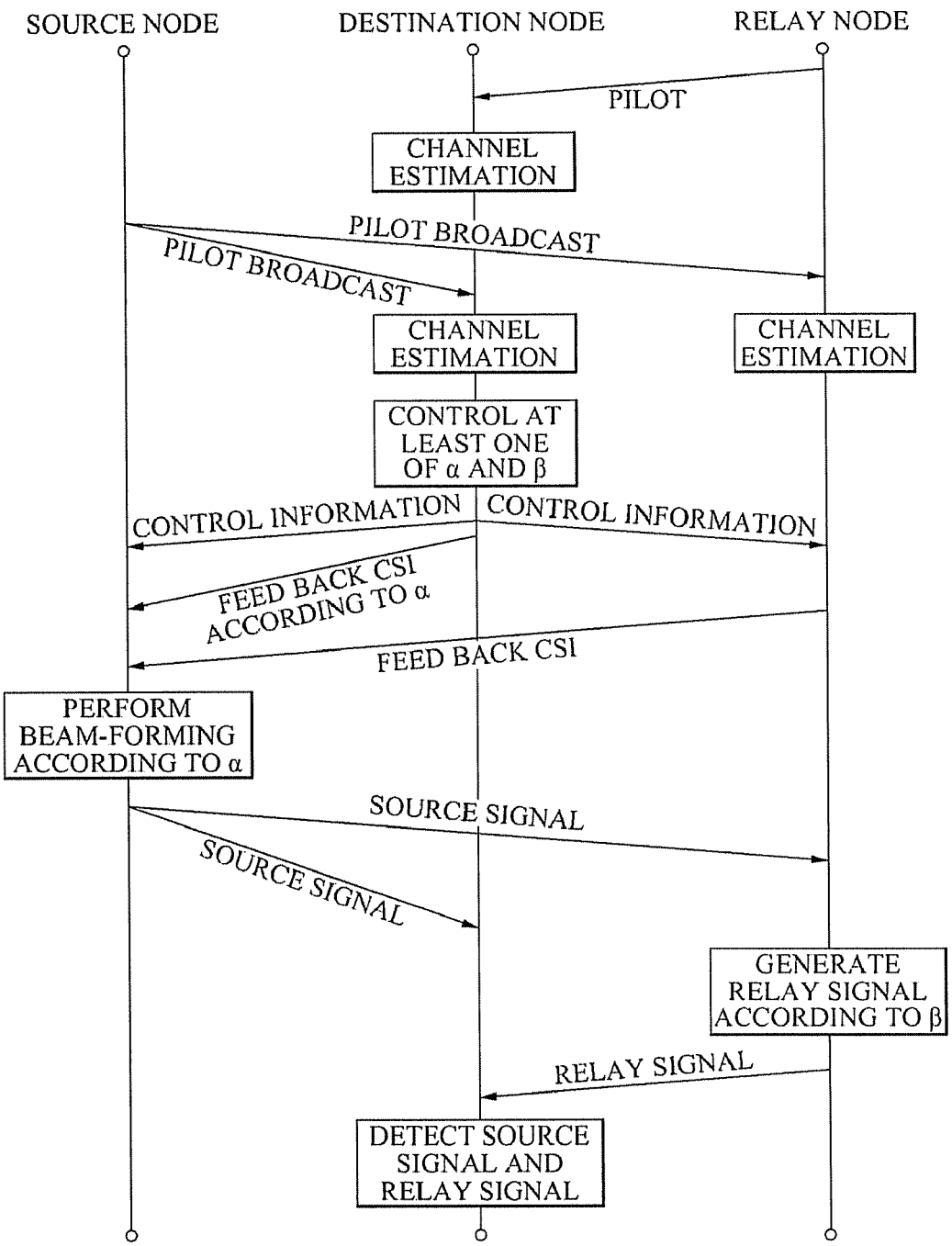
FIG. 3 is a flowchart illustrating a signal transmission process among nodes when at least one of an amount of channel state information and a relay level is controlled in a destination node according to an embodiment of the present invention.

FIG. 3 is a flowchart illustrating a signal transmission process among nodes when at least one of an amount of CSI and a relay level is controlled in a destination node according to an embodiment of the present invention.

Referring to FIG. 3, the destination node can estimate a channel state of a wireless channel generated between the destination node and a relay node over a long period of time. Specifically, the relay node transmits a pilot signal to the destination node, and the destination node estimates the channel state of the wireless channel generated between the destination node and the relay node using the pilot signal.

Also, the source node broadcasts the pilot signal to the destination node and the relay node. In this instance, the destination node and the relay node estimate the channel state of the wireless channels generated between the source node and the destination node, and between the source node and the relay node using the pilot signal.

In this instance, the destination node controls at least one of the amount of the CSI 'α' and the relay level β by considering the channel state of the wireless channel generated between the source node and the destination node, and the channel state of the wireless channel generated between the relay node and the destination node.

In this instance, when the amount of the CSI 'α' is fixed in advance, the destination node controls the relay level β by considering the amount of the CSI 'α'. Conversely, when the relay level β is previously fixed, the destination node controls the amount of the CSI 'α' by considering the relay level β. Also, the destination node can simultaneously control the amount of the CSI 'α' and the relay level β.

For example, when it is determined that the destination node using more wireless resources for the beam-forming is efficient, the amount of the CSI 'α' can be controlled to be high in order to improve a beam-forming performance. Conversely, when it is determined that using more wireless resources for the signal relay is determined as efficient according to the channel state, the relay level β of the relay signal can be controlled to be high.

The destination node transmits, to the source node and the relay node, the control information related to at least one of the amount of the CSI 'α' and the relay level β. In this instance, the destination node can transmit the control information using various schemes at various times.

Also, the destination node feeds back, to the source node, the CSI of the wireless channel generated between the destination node and the source node according to the controlled amount of the CSI 'α'. For example, when the amount of the CSI 'α' is controlled to be high, the destination node can feed back the CSI having a high quantization level.

Also, the relay node can also feed back, to the source node, the CSI of the wireless channel generated between the source node and the relay node. In this instance, the relay node can also feed back the CSI to the source node according to the controlled amount of the CSI 'α'. Also, the relay node can also feed back, to the source node, the CSI having the amount different from α.

The source node generates or selects a beam-forming vector according to the amount of the CSI 'α', performs beam-forming of a data stream based on the beam-forming vector, and generates the source signal. The generated source signal is transmitted to the destination node and the relay node according to an SDMA scheme via a plurality of antennas installed in the source node.

When the amount of the CSI 'α' is controlled to be high, the source node can perform the beam-forming corresponding to the actual wireless channel. In this case, the performance of the entire beam-forming can be improved.

The relay node receives the source signal via the wireless channel, and generates the relay signal. In this instance, the relay node generates the relay signal according to the controlled relay level β. For example, the relay node can determine a power of the relay signal, a relaying time of the relay signal, a frequency band of the relay signal, and the like, according to the relay level β.

The destination node detects the source signal and the relay signal transmitted from the source node. In this instance, the destination node can sequentially detect the source signal and the relay signal, and simultaneously detect the source signal and the relay signal.

In this instance, when the amount of the CSI 'α' is controlled to be large, the power of the source signal can increase, and when the relay level β is controlled to be high, the power of the relay signal can increase. Accordingly, the present invention can appropriately allocate the wireless resources to the beam-forming and to a relay signal generation being adaptive to a predetermined wireless environment. Accordingly, the destination node can achieve a high SINR and a high data rate.

Figure 4:
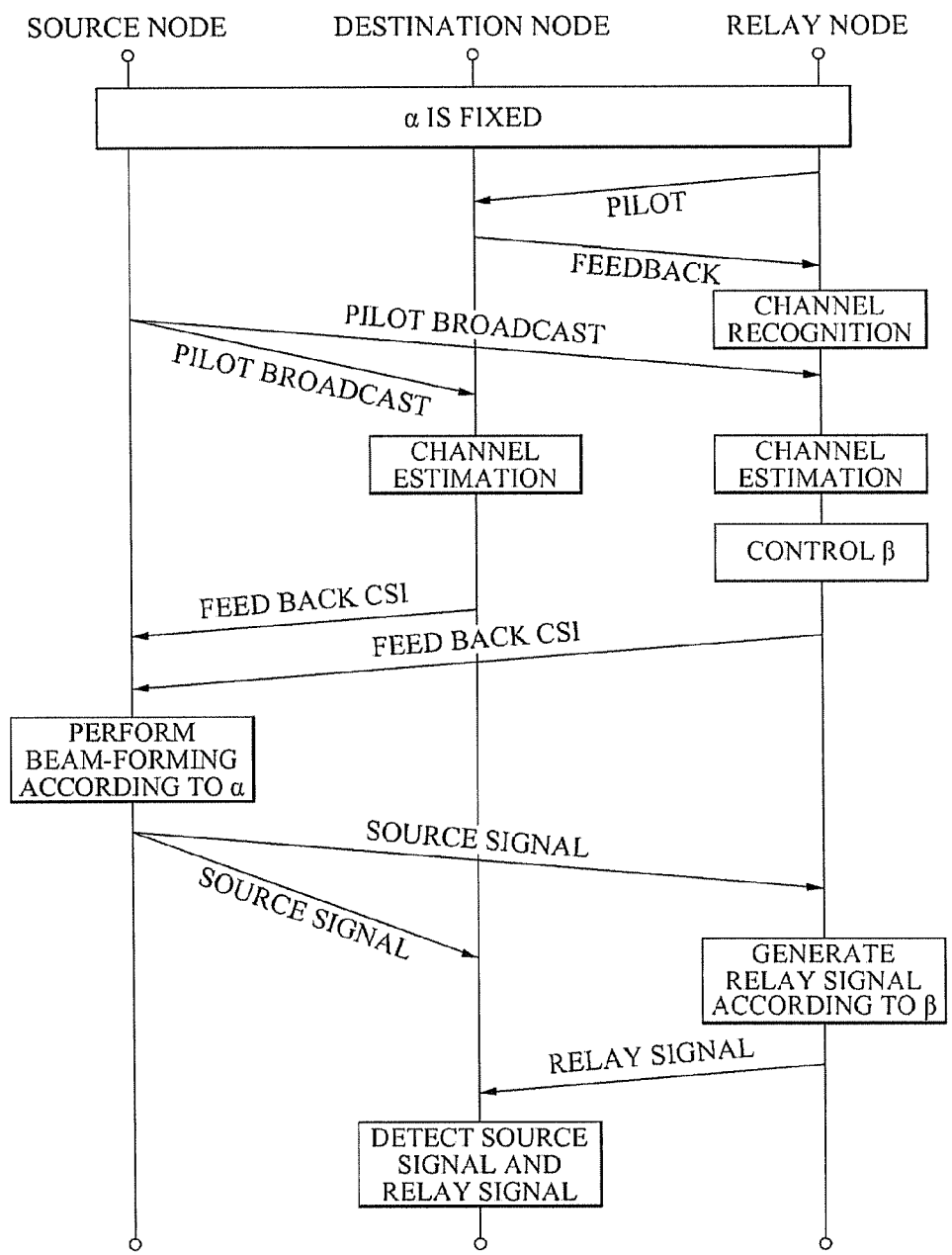
FIG. 4 is a flowchart illustrating a signal transmission process among nodes when an amount of channel state information is fixed and a relay node determines a relay level according to an embodiment of the present invention.

FIG. 4 is a flowchart illustrating a signal transmission process among nodes when an amount of channel state information is fixed and a relay node determines a relay level according to an embodiment of the present invention.

Referring to FIG. 4, the amount of the CSI 'α' is fixed (α=X), and the relay node recognizes a channel state of a wireless channel generated between the relay node and a destination node via a pilot signal.

Also, a source node broadcasts the pilot signal to the destination node and the relay node. In this instance, the destination node and the relay node estimate the channel state of the wireless channels generated between the source node and the destination node, and between the source node and the relay node using the pilot signal.

The relay node controls the relay level β by considering at least one of the channel state of the wireless channel generated between the relay node and the destination node, and the channel state of the wireless channel generated between the relay node and the source node. In this instance, the relay node can control the relay level β by further considering the fixed amount of the CSI 'α' (α=X). Specifically, the relay node determines which relay level is appropriate for a predetermined wireless environment, and controls the relay level β, in an environment where the amount of the CSI 'α' is fixed (α=X).

Also, the destination node and the relay node feed back, to the source node, the CSI of the wireless channel generated between the source node and the destination node, and between the source node and the relay node according to the fixed amount of the CSI 'α' (α=X).

The source node selects a beam-forming vector based on the CSI fed back according to the fixed amount of the CSI 'α'. In this instance, the source node performs beam-forming of a data stream using the selected beam-forming vector, and generates the source signal.

The relay node generates the relay signal by relaying the source signal according to the controlled relay level. When the relay level is controlled to be high, a power of the relay signal, a relaying time, and the like, can increase.

Also, the destination node detects the source signal and the relay signal transmitted from the source node. In this instance, the destination node can simultaneously detect the source signal and the relay signal, and sequentially detect the source signal and the relay signal.

Figure 5:
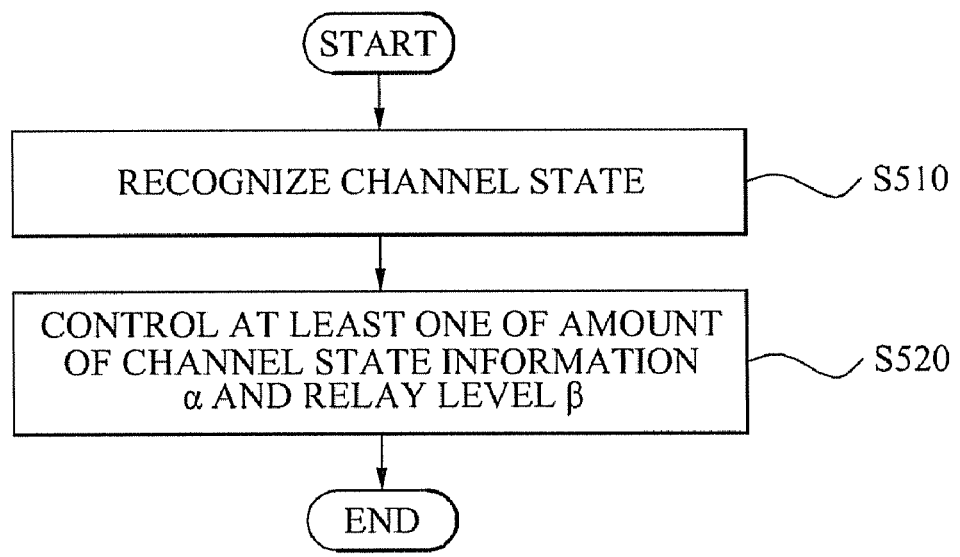
FIG. 5 is a flowchart illustrating a method of allocating a wireless resource for an SDMA communication according to an embodiment of the present invention.

FIG. 5 is a flowchart illustrating a method of allocating a wireless resource for an SDMA communication according to an embodiment of the present invention.

Referring to FIG. 5, the method of allocating the wireless resource for the SDMA communication according to the present embodiment of the present invention recognizes a channel state of wireless channels generated among adjacent nodes including a source node, a relay node, and a destination node in operation S510.

Also, the method of allocating the wireless resource for the SDMA communication according to the present embodiment of the present invention controls at least one of an amount of CSI 'α' fed back from the destination node to the source node, and a relay level β of a relay signal, the relay signal being generated by relaying a source signal transmitted from the source node, according to the channel state in operation S520.

In this instance, the controlling in operation S520 controls at least one of the amount of the CSI 'α' and the relay level β by considering a ratio of the relay level β to the amount of the CSI 'α' according to the channel state.

In this instance, the controlling in operation S520 controls at least one of the amount of the CSI 'α' and the relay level β by comparing a channel state of the first wireless channel generated between the source node and the destination node, with a channel state of the second wireless channel generated between the relay node and the destination node.

In this instance, the controlling in operation S520 controls at least one of the amount of the CSI 'α' and the relay level β to maximize an SINR of a received signal which is received by the destination node.

In this instance, the controlling in operation S520 controls at least one of the amount of the CSI 'α' and the relay level β to reduce the relay level β as the amount of the CSI, 'α' increases, and to reduce the amount of the CSI 'α' as the relay level β increases.

In this instance, when the amount of the CSI 'α' is fixed, the controlling in operation S520 controls the relay level β by considering the fixed amount of the CSI 'α', and when the relay level β is fixed, the controlling in operation S520 controls the amount of the CSI 'α' by considering the fixed relay level β.

Also, the method of allocating the wireless resource for the SDMA communication according to the present embodiment of the present invention further includes transmitting, to the adjacent nodes, control information related to at least one of the controlled amount of the CSI 'α' and the controlled relay level β, even though the transmitting is not illustrated in FIG. 5.

Since contents being not described with reference to FIG. 5 are described in detail with reference to FIGS. 1 through 4, a description thereof is omitted hereinafter.

The method of allocating the wireless resource for the SDMA communication according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there is provided a system and method of allocating a wireless resource for an SDMA communication which can achieve a high data rate and a high SINR by mixing an SDMA technology and a signal relay technology, and transceiving data.

Also, according to the present invention, there is provided a system and method of allocating a wireless resource for an SDMA communication which can efficiently distribute wireless resources by determining a wireless resource needed for beam-forming and a wireless resource needed for a signal relay considering a channel state of wireless channels generated among adjacent nodes.

Also, according to the present invention, there is provided a system and method of allocating a wireless resource for an SDMA communication which can achieve a high data rate and a high SINR by appropriately distributing the wireless resource needed for beam-forming and the wireless resource needed for a signal relay.

Also, according to the present invention, there is provided a system and method of allocating a wireless resource for an SDMA communication which can efficiently use the wireless channel by appropriately controlling an amount of channel state information fed back by a destination node.

Also, according to the present invention, there is provided a system and method of allocating a wireless resource for an SDMA communication which can reduce a load on hardware of a mobile terminal and conserve power by efficiently allocating the wireless channel.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A system for allocating a wireless resource for a Space Division Multiple Access (SDMA) communication, the system comprising:
at least one processor, the at least one processor configured to recognize a channel state of wireless channels generated among adjacent nodes including a source node, a relay node, and a destination node, and
to control at least one of an amount of channel state information fed back from the destination node to the source node, and a relay level of a relay signal, the relay signal being generated by relaying a source signal transmitted from the source node, by considering a ratio of the relay level to the amount of the channel state information according to the channel state.

2. The system of claim 1, wherein the at least one processor controls at least one of the amount of the channel state information and the relay level by comparing a channel state of the first wireless channel generated between the source node and the destination node, with a channel state of the second wireless channel generated between the relay node and the destination node.

3. The system of claim 1, wherein the at least one processor controls at least one of the amount of the channel state information and the relay level to maximize a Signal-to-Interference and Noise Ratio of a received signal which is received by the destination node.

4. The system of claim 1, wherein the at least one processor controls at least one of the amount of the channel state information and the relay level to reduce the relay level as the amount of the channel state information increases, and to reduce the amount of the channel state information as the relay level increases.

5. The system of claim 1, wherein, when the amount of the channel state information is fixed, the at least one processor controls the relay level by considering the fixed amount of the channel state information, and when the relay level is fixed, the at least one processor controls the amount of the channel state information by considering the fixed relay level.

6. The system of claim 1, wherein the relay level is related to at least one of a relaying time of the relay signal, a power of the relay signal, and a frequency band of the relay signal.

7. The system of claim 1, wherein the at least one processor transmits, to the adjacent nodes, control information related to at least one of the controlled amount of the channel state information and the controlled relay level.

8. The system of claim 1, wherein the source node performs beam-forming of a data stream using the channel state information fed back from the destination node according to the controlled amount of the channel state information, and generates the source signal.

9. The system of claim 1, wherein the relay node generates the relay signal generated by relaying the source signal according to the controlled relay level.

10. The system of claim 1, wherein the destination node feeds back the channel state information to the source node according to the controlled amount of the channel state information.

11. The system of claim 8, wherein the destination node detects the source signal generated by performing the beam-forming of the data stream, and the relay signal relayed according to the relay level.

12. A method of allocating a wireless resource for a Space Division Multiple Access (SDMA) communication, the method comprising:

recognizing a channel state of wireless channels generated among adjacent nodes including a source node, a relay node, and a destination node; and controlling at least one of an amount of channel state information fed back from the destination node to the source node according to the channel state, and a relay level of a relay signal, the relay signal being generated by relaying a source signal transmitted from the source node, by considering a ratio of the relay level to the amount of the channel state information according to the channel state.

13. The method of claim 12, wherein the controlling controls at least one of the amount of the channel state information and the relay level by comparing a channel state of the first wireless channel generated between the source node and the destination node, with a channel state of the second wireless channel generated between the relay node and the destination node.

14. The method of claim 12, wherein the controlling controls the at least one of the amount of the channel state information and the relay level to maximize a Signal-to-Interference and Noise Ratio of a received signal which is received by the destination node.

15. The method of claim 12, wherein the controlling controls the at least one of the amount of the channel state information and the relay level to reduce the relay level as the amount of the channel state information increases, and to reduce the amount of the channel state information as the relay level increases.

16. The method of claim 12, wherein, when the amount of the channel state information is fixed, the controlling controls the relay level by considering the fixed amount of the channel state information, and when the relay level is fixed, the controlling controls the amount of the channel state information by considering the fixed relay level.

17. The method of claim 12, further comprising:
transmitting, to the adjacent nodes, control information related to at least one of the controlled amount of the channel state information and the controlled relay level.

18. A non-transitory computer-readable recording medium storing a program for implementing a method of allocating a wireless resource for a Space Division Multiple Access (SDMA) communication, the method comprising:

recognizing a channel state of wireless channels generated among adjacent nodes including a source node, a relay node, and a destination node; and controlling at least one of a amount of channel state information fed back from the destination node to the source node based on the channel state, and a relay level of a relay signal, the relay signal being generated by relaying a source signal transmitted from the source node, by considering a ratio of the relay level to the amount of the channel state information according to the channel state.

* * * * *